United States Patent
Lim

(10) Patent No.: US 6,701,166 B2
(45) Date of Patent: Mar. 2, 2004

(54) SWITCH FOR SENSING OPENING-CLOSING OF RADIO TERMINAL

(75) Inventor: Heui-Do Lim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 233 days.

(21) Appl. No.: 09/730,635

(22) Filed: Dec. 6, 2000

(65) Prior Publication Data

US 2001/0041543 A1 Nov. 15, 2001

(30) Foreign Application Priority Data

Dec. 9, 1999 (KR) ........................................ 1999-56125

(51) Int. Cl.[7] ................................................. H04Q 7/20
(52) U.S. Cl. ................ 455/575.3; 455/575.1; 455/90.3; 455/128
(58) Field of Search ..................... 455/90, 575, 450, 455/575.3, 575.1

(56) References Cited

U.S. PATENT DOCUMENTS

| | | | | |
|---|---|---|---|---|
| 3,995,210 A | * | 11/1976 | Milkovic | ..................... 323/94 |
| 6,230,028 B1 | * | 5/2001 | Shirakawa | ................... 455/566 |
| 6,334,050 B1 | * | 12/2001 | Skarby | ....................... 455/126 |
| 6,353,733 B1 | * | 3/2002 | Murray | ........................ 455/90 |
| 6,356,741 B1 | * | 3/2002 | Bilotti | ........................ 455/90 |

* cited by examiner

Primary Examiner—William Trost
Assistant Examiner—Brandon J Miller
(74) Attorney, Agent, or Firm—Dilworth & Barrese LLP

(57) ABSTRACT

A switch for sensing an open or closed state of a flip-type or folder-type radio terminal which has first and second structures joined each other to have an open or closed state. The switch comprises a hall sensor for generating voltage according to the strength of an input magnetic field proportionally to the distance to a magnet; a variable amplifier for variably amplifying the voltage from the hall sensor to output a variably amplified voltage signal in response to a control signal; and a comparator for comparing the signal from the variable amplifier with a reference voltage to output a signal for indicating the open or closed state. The sensing value of the switch can be easily adjusted to sense opening/closing of a folder of the terminal.

5 Claims, 2 Drawing Sheets

SWITCH FOR SENSING OPENING-CLOSING OF RADIO TERMINAL

CROSS-REFERENCE TO RELATED APPLICATIONS

This application claims priority pursuant to 35 U.S.C. § 119 to an application entitled "SWITCH FOR SENSING OPENING-CLOSING OF RADIO TERMINAL" filed with the Korean Industrial Property Office on Dec. 9, 1999 and assigned Ser. No. 1999-56125, the contents of which is hereby incorporated by reference.

BACKGROUND OF THE INVENTION

1. Field of the Invention

The present invention relates to a switch used in a flip-type or folder-type radio terminal, and in particular to a hall switch which has an adjustable sensing value.

2. Description of the Related Art

In general, in a foldable terminal for mobile communication, the terminal is controlled by sensing opening and closing of a flip or folder to enable a speech path or activate a display lamp. In other words, the speech path is enabled when a user opens the flip of the terminal to answer a call, and the speech path is disabled by closing of the flip. Also, the display lamp is activated by opening the flip so that the user can see the display. Hereinafter, the "foldable terminal" will be referred to as a terminal comprised of first and second structures such as a flip-type or folder-type radio terminal for mobile communication.

In the prior art, a lead switch comprised of a permanent magnet and an elastic magnetic body has been used to sense the opening/closing of the flip. For example, when the flip is closed, the magnet approaches the magnetic body so that the magnetic body closes a contact. When the magnet withdraws from the magnetic body, the magnetic body opens the contact.

However, there is a problem that since the foregoing lead switch is a mechanical structure, the distance between the magnet and the magnetic body is required to be the same in order to maintain uniform strength of each model. For example, an erroneous operation can take place when the switch does not close the contact in a new model because the distance between the magnet and the magnetic body is too long. Therefore, in the new model, the strength of the magnet, or the distance between the magnet and the magnetic body must be adjusted.

SUMMARY OF THE INVENTION

It is therefore an object of the invention to provide an apparatus for adjusting the sensitivity of a hall switch of a folder-type or flip-type radio terminal without replacing a magnet or adjusting the distance between the magnet and a magnet body even in a new or different model.

Accordingly, a switch for sensing an open or closed state of a foldable terminal which has first and second structures rotatably joined to each other is provided. The switch includes a hall sensor for generating voltage according to the strength of an input magnetic field proportionally to the distance to a magnet; a variable amplifier for variably amplifying the voltage from the hall sensor to output a variably amplified voltage signal in response to a control signal; and a comparator for comparing the signal from the variable amplifier with a reference voltage to output a signal for indicating the open or closed state.

DETAILED DESCRIPTION OF PREFERRED EMBODIMENTS

Hereinafter, preferred embodiments of the invention will be described in detail with reference to the accompanying drawings. The following description contains specific expressions on parts or constructions, however it will be apparent to those skilled in the art that those specific parts or constructions are only for assisting the overall understanding of the invention but the invention can be applied without those specific parts or constructions. For clarity, a description of known functions and configurations may be omitted.

Figure 1:
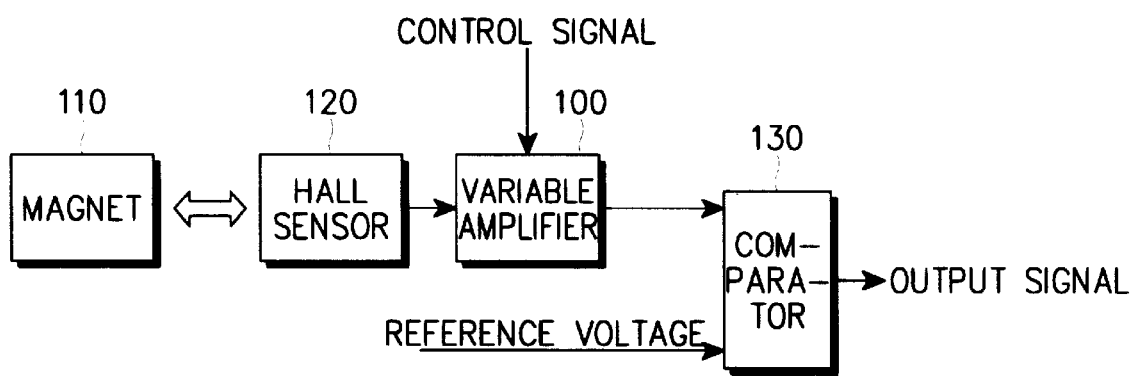
FIG. 1 is a schematic view illustrating the construction of a hall switch according to the present invention.
Figure 2:
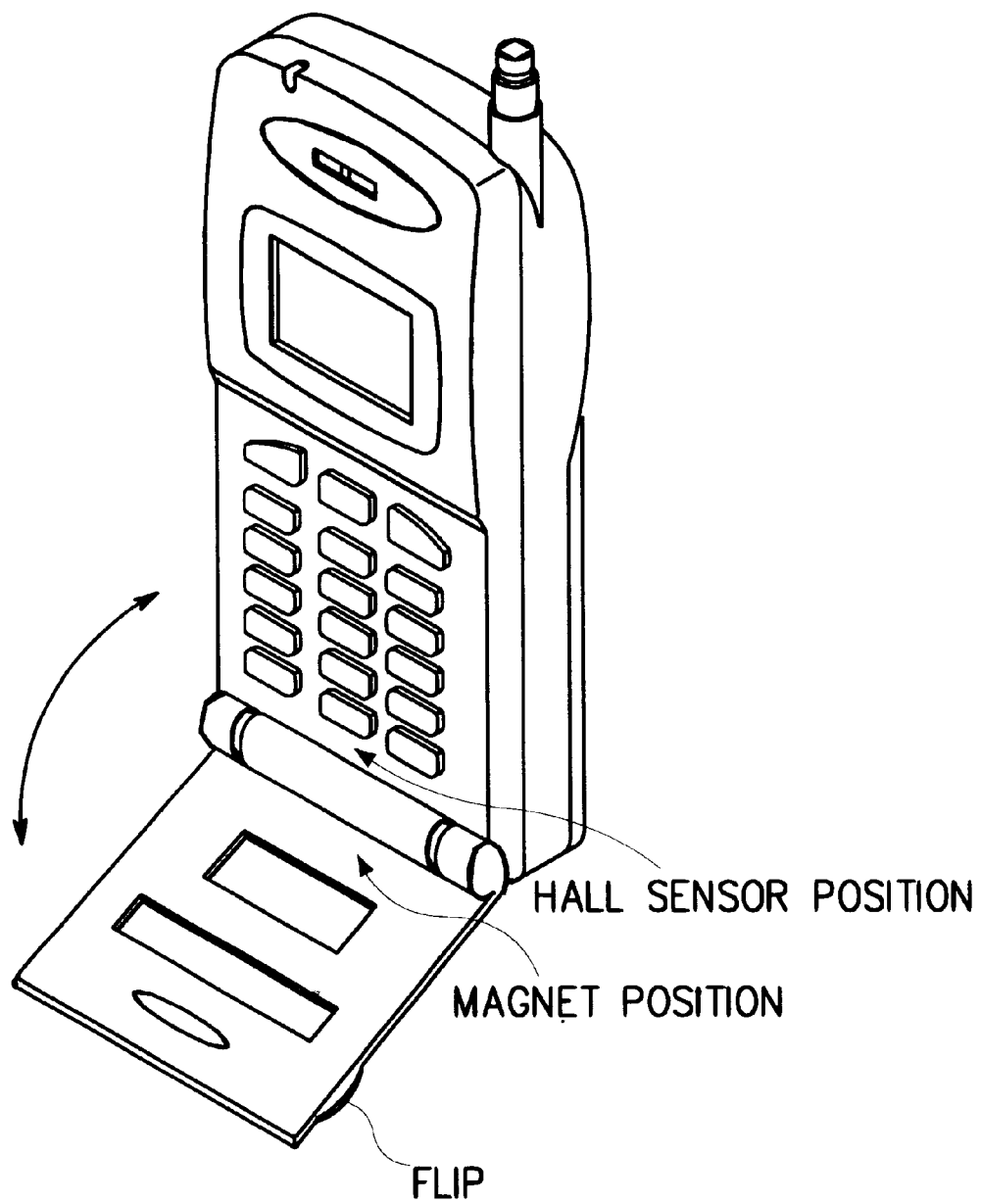
FIG. 2 is a perspective view illustrating a flip-type terminal according to an embodiment of the invention.

FIG. 1 schematically shows the construction of a hall switch according to an embodiment of the present invention, and FIG. 2 is a perspective view for illustrating a flip-type terminal according to an embodiment of the present invention.

Hereinafter structures and operations according to a preferred embodiment of the invention will be described with reference to FIG. 1.

A magnet 110 is a permanent magnet for generating a certain magnetic field, and is placed within a flip of a flip-type terminal so that the distance to a hall sensor 120 is changed according to opening/closing of the flip by the user (shown in FIG. 2). The hall sensor 120 generates a voltage proportional to the strength of the input magnetic field.

The voltage generated from the hall sensor 120 is inputted into a variable amplifier 100. The variable amplifier 100 amplifies the voltage from the hall sensor 120 to output an amplified voltage. Here, the amplifier 100 has an amplification factor which is adjusted according to a control signal inputted to the variable amplifier 100. The control signal is generated from a variable amplifier control unit (not shown) and varies the amplification factor of the variable amplifier 100. The amplification factor of the amplifier 100 can be varied by using a variable resistance. A drive voltage inputted to the variable amplifier 100 can be varied by using the variable resistance so that the amplification factor of the variable amplifier 100 can be varied. In other words, the sensitivity of the switch can be maintained at a constant value by adjusting the amplification by the amplifier 100 even though the distance between the magnet 110 and the hall sensor 120 changes due to development of a new terminal model.

The signal from the variable amplifier 100 is inputted to a comparator 130. The comparator 130 compares the signal from the variable amplifier 100 with a predetermined reference voltage to generate an output signal. Namely, the comparator 130 generates HIGH signal when the signal from the variable amplifier 100 is larger than that of the reference voltage. A LOW signal is generated when the signal from the variable amplifier 100 is less than that of the reference voltage.

When the flip is closed a HIGH signal is outputted, and when the flip is open a LOW signal is outputted from the comparator 130. The control unit controls the operations including connection or disconnection of the terminal to the speech path.

Describing the invention in short, the voltage from the hall sensor 120 is variably amplified via the variable amplifier 100 so that the cumbersome works of replacing the magnet 110 or adjusting the distance between the magnet 110 and the hall sensor 120 are eliminated even though the distance between the magnet 110 and the hall sensor 120 is varied according to change of the model.

While the invention has been described in detail by specific reference to preferred embodiments thereof, it should be understood that variations and modifications thereof may be made without departing from the true spirit and scope of the invention. Therefore, it should be understood that the true spirit and the scope of the invention are not limited by the above embodiment, but defined by the appended claims and the equivalents thereof.

As described hereinabove according to the invention, the voltage from the hall sensor 120 is variably amplified via the variable amplifier 100 so that the sensitivity of the switch can be adjusted without replacing the magnet or adjusting the distance between the magnet and the magnetic body when the model is changed in the folder-type or flip-type terminals.

What is claimed is:

1. A switch for sensing opening or closing of a foldable terminal which has first and second structures joined to each other to have an open or closed state, comprising:
   a hall sensor for generating voltage according to the strength of an input magnetic field in proportion to the distance to a magnet;
   a variable amplifier for variably amplifying the voltage from said hall sensor to output a variably amplified voltage signal in response to a control signal that is predetermined to correspond to each of a plurality of foldable terminal models based on a distance between the magnet and the hall sensor when the foldable terminal is closed; and
   a comparator for comparing the signal from said variable amplifier with a reference voltage to output a signal for indicating opening or closing.

2. A switch in accordance with claim 1, wherein the variable amplifier has an amplification factor which is varied according to a variable resistance.

3. A communication terminal comprising:
   a first body member;
   a second body member pivotally connected to the first body member;
   a magnet positioned in the first body member;
   a hall sensor positioned in the second body member such that when the first and second body members are in a closed position, the hall sensor and the magnet are in close proximate relation, and when the first and second body members are in an open position, the hall sensor and the magnet are spaced apart, wherein the hall sensor and magnet form a switch to sense an open or closed condition of the terminal; and
   a variable amplifier for variably amplifying voltage from the hall sensor to provide a variably amplified voltage signal in response to a control signal that is predetermined to correspond to each of a plurality of communication terminals based on the magnet strength.

4. The communication terminal as recited in claim 3, further comprising a comparator for comparing the signal from said variable amplifier with a reference voltage to output a signal for indicating opening or closing.

5. A switch usable for sensing opening or closing of a foldable terminal which have first and second structures joined to each other to have an open or closed state, comprising:
   a hall sensor for generating voltage according to the strength of an input magnetic field in proportion to the distance to a magnet;
   a variable amplifier for variably amplifying the voltage from said hall sensor to output a variably amplified voltage signal in response to a control signal that is predetermined to correspond to each of a plurality of foldable terminal models based on the magnet strength; and
   a comparator for comparing the signal from said variable amplifier with a reference voltage to output a signal for indicating opening or closing.

* * * * *